(12) United States Patent
Wang

(10) Patent No.: US 11,208,933 B2
(45) Date of Patent: Dec. 28, 2021

(54) EXHAUST GAS AFTER-TREATMENT MIXING DEVICE

(71) Applicant: Tenneco (Suzhou) Emission System Co., LTD., Suzhou (CN)

(72) Inventor: Cong Wang, Suzhou (CN)

(73) Assignee: TENNECO (SUZHOU) EMISSION SYSTEM CO., LTD., Suzhou (CN)

( * ) Notice: Subject to any disclaimer, the term of this patent is extended or adjusted under 35 U.S.C. 154(b) by 0 days.

(21) Appl. No.: 16/647,481

(22) PCT Filed: Jun. 27, 2018

(86) PCT No.: PCT/CN2018/092996
§ 371 (c)(1),
(2) Date: Mar. 13, 2020

(87) PCT Pub. No.: WO2019/056823
PCT Pub. Date: Mar. 28, 2019

(65) Prior Publication Data
US 2020/0217233 A1 Jul. 9, 2020

(30) Foreign Application Priority Data

Sep. 19, 2017 (CN) .......................... 201710851869.0

(51) Int. Cl.
*F01N 3/28* (2006.01)
(52) U.S. Cl.
CPC .................. *F01N 3/2892* (2013.01)
(58) Field of Classification Search
CPC .. F01N 3/3892; F01N 3/2066; F01N 2240/20; F01N 2470/06; F01N 2470/08;
(Continued)

(56) References Cited

U.S. PATENT DOCUMENTS

| 4,909,635 | A | 3/1990 | LeCoffre et al. |
| 8,033,104 | B2 | 10/2011 | Zhang |
| 8,397,495 | B2 * | 3/2013 | Salanta ................. B01F 5/0451 60/324 |
| 9,352,276 | B2 | 5/2016 | Sampath |
| 9,784,163 | B2 | 10/2017 | Noren, IV et al. |

(Continued)

FOREIGN PATENT DOCUMENTS

| CN | 201551965 U | 8/2010 |
| CN | 204877615 U | 12/2015 |

(Continued)

*Primary Examiner* — Charles G Freay
*Assistant Examiner* — Kelsey L Stanek
(74) *Attorney, Agent, or Firm* — Cheng-Ju Chiang

(57) ABSTRACT

The present application discloses an exhaust gas after-treatment mixing device including a casing, a mixing pipe and a partition plate fixed on a periphery of the mixing pipe. The partition plate includes a first plate on one side of the mixing pipe, a second plate on the other side of the mixing pipe and a third plate connecting the first plate and the second plate. The mixing pipe includes a first pipe portion and a second pipe portion. The first pipe portion is provided with at least two first openings located on two sides thereof, respectively. The exhaust gas after-treatment mixing device includes a first shielding plate and a second shielding plate shielding front ends of the first openings, respectively, so that most of exhaust gas needs to flow bypass the first shielding plate and the second shielding plate before entering the first openings.

16 Claims, 9 Drawing Sheets

(58) Field of Classification Search
CPC ............ F01N 2570/14; F01N 2610/02; F01N 2250/02
USPC .................................................. 60/317, 324
See application file for complete search history.

(56) References Cited

U.S. PATENT DOCUMENTS

| | | | | |
|---|---|---|---|---|
| 2010/0005790 A1* | 1/2010 | Zhang | ............... | F01N 3/36 60/301 |
| 2016/0215673 A1* | 7/2016 | Noren, IV | ............ | B01F 5/0057 |
| 2018/0066559 A1 | 3/2018 | Haverkamp et al. | | |
| 2018/0306083 A1* | 10/2018 | Sampath | ............... | B01F 5/0473 |
| 2019/0211732 A1 | 7/2019 | Haverkamp et al. | | |

FOREIGN PATENT DOCUMENTS

| | | | | |
|---|---|---|---|---|
| CN | 106014560 | A | 10/2016 | |
| CN | 205714373 | U | 11/2016 | |
| CN | 106246303 | A | 12/2016 | |
| CN | 106523091 | A | 3/2017 | |
| CN | 206129367 | U | 4/2017 | |
| CN | 106640301 | A * | 5/2017 | ........... F01N 3/2892 |
| CN | 106640301 | A | 5/2017 | |
| CN | 107165704 | A * | 9/2017 | ........... F01N 3/2892 |
| CN | 107165704 | A | 9/2017 | |
| CN | 206487537 | U | 9/2017 | |
| CN | 107559078 | A | 1/2018 | |
| CN | 107575287 | A | 1/2018 | |
| CN | 207178013 | U | 4/2018 | |
| CN | 207526559 | U | 6/2018 | |
| DE | G9113807.8 | U1 | 12/1991 | |
| DE | 102012216676 | A1 | 3/2014 | |
| EP | 2168672 | A1 | 3/2010 | |
| JP | 2006-77576 | A | 3/2006 | |
| JP | 5090890 | B2 | 12/2012 | |
| WO | 2012/044233 | A1 | 4/2012 | |
| WO | 2016/111701 | A1 | 7/2016 | |

* cited by examiner

EXHAUST GAS AFTER-TREATMENT MIXING DEVICE

CROSS-REFERENCE TO RELATED APPLICATION

This patent application is a 35 U.S.C. § 371 National Phase conversion of International (PCT) Patent Application No. PCT/CN2018/092996, filed on Jun. 27, 2018, which claims priority to a Chinese Patent Application No. 201710851869.0, filed on Sep. 19, 2017 with an invention title of "Exhaust Gas After-Treatment Mixing Device", the entire content of which is incorporated herein by reference. The PCT International Patent Application was filed and published in Chinese.

TECHNICAL FIELD

This application relates to an exhaust gas after-treatment mixing device which belongs to a technical field of engine exhaust gas after-treatment.

BACKGROUND

Studies have shown that the uniformity of ammonia distribution in the exhaust gas after-treatment system (such as Selective Catalytic Reduction system, SCR system) has a significant impact on the overall performance and durability of the system. If the ammonia distribution is not uniform, it will cause too much ammonia in the local area and easily cause ammonia leakage, while in other ammonia-thin areas, the conversion efficiency of nitrogen oxides (NOx) will be too low. The uneven distribution of ammonia over a long period of time will lead to uneven aging of the catalyst, which will affect the overall performance of the catalyst. In addition, the uneven distribution of urea droplets will cause the temperature of the local pipe wall or the mixed structure to be too low, forming crystals, and in severe cases, the exhaust pipe will be blocked, resulting in a decrease in engine power performance.

SUMMARY

An object of the present application is to provide an exhaust gas after-treatment mixing device with better mixing effect.

In order to achieve the above object, the present application adopts the following technical solution: an exhaust gas after-treatment mixing device includes a casing, a mixing pipe located in the casing and a partition plate fixed on a periphery of the mixing pipe. The casing is separated by the partition plate to form a first space communicating with a first after-treatment carrier assembly and a second space communicating with a second after-treatment carrier assembly. The partition plate includes a first plate on one side of the mixing pipe, a second plate on the other side of the mixing pipe and a third plate connecting the first plate and the second plate. The third plate is provided with a through hole through which the mixing pipe extends. The mixing pipe comprises a first pipe portion located in the first space and a second pipe portion located in the second space, wherein the first pipe portion is provided with at least two first openings located on two sides thereof, respectively. The exhaust gas after-treatment mixing device further includes a first shielding plate and a second shielding plate shielding front ends of the first openings, respectively, so that most of exhaust gas needs to flow bypass the first shielding plate and the second shielding plate before entering the first openings.

As a further improved technical solution of the present application, the second pipe portion is provided with at least two second openings located on two sides thereof, respectively, and the second openings communicate with the second space.

As a further improved technical solution of the present application, the casing is provided with a first axis, the mixing pipe is provided with a second axis, and the first axis is perpendicular to the second axis.

As a further improved technical solution of the present application, the mixing pipe is arranged vertically, the first plate and the second plate both extend vertically but along opposite directions, and the third plate extends horizontally.

As a further improved technical solution of the present application, the partition plate is substantially Z-shaped, the first plate is located at a lower left of the mixing pipe, and the second plate is located at an upper right of the mixing pipe.

As a further improved technical solution of the present application, the first plate is provided with a first arc-shaped surface abutting on the second pipe portion, and the second plate is provided with a second arc-shaped surface abutting on the first pipe portion.

As a further improved technical solution of the present application, the exhaust gas after-treatment mixing device further includes a rectifying plate fixed to the mixing pipe, and the first shielding plate and the second shielding plate are located on two sides of the rectifying plate, respectively.

As a further improved technical solution of the present application, the rectifying plate comprises a third curved surface abutting on the first pipe portion, and the first shielding plate and the second shielding plate extend sidewardly from the third curved surface along opposite directions.

As a further improved technical solution of the present application, the first shielding plate is provided with a first arc edge abutting on an inside of the casing, and the second shielding plate is provided with a second arc edge abutting on an inside of the casing.

As a further improved technical solution of the present application, the exhaust gas after-treatment mixing device further includes a plate located at a bottom of the mixing pipe, and the plate is provided with an arc-shaped protrusion protruding into the second pipe portion.

Compared with the prior art, the present application improves the uniformity of airflow distribution and the mixing effect by providing the first shielding plate and the second shielding plate for the airflow adjustment.

DETAILED DESCRIPTION

Figure 1:
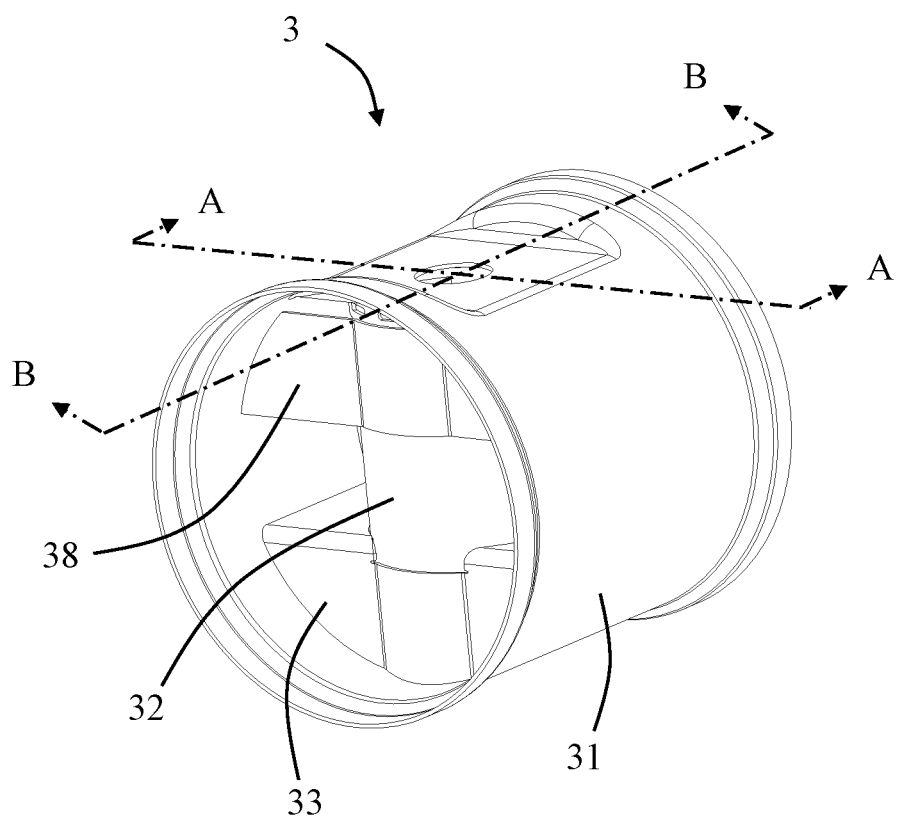
FIG. 1 is a schematic perspective view of an exhaust gas after-treatment mixing device according to the present application.
Figure 2:
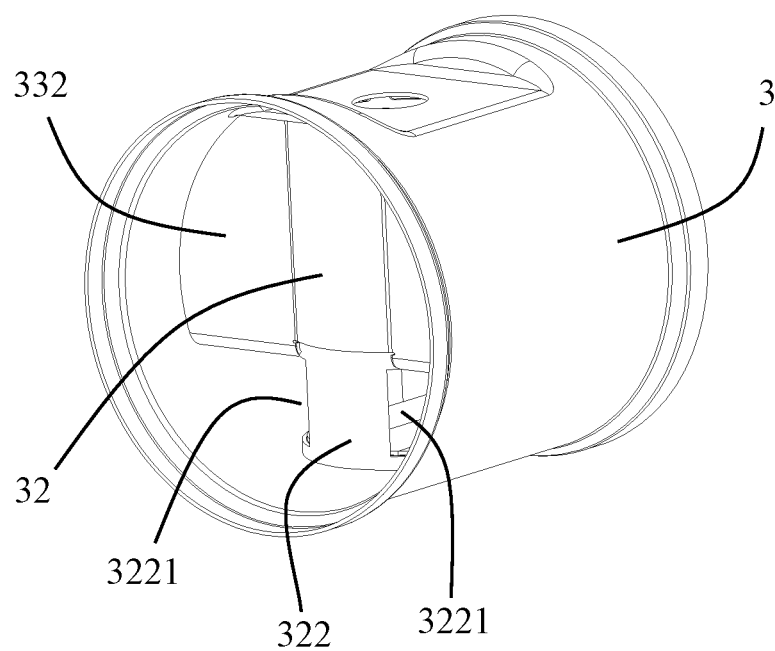
FIG. 2 is another schematic perspective view of FIG. 1.
Figure 3:
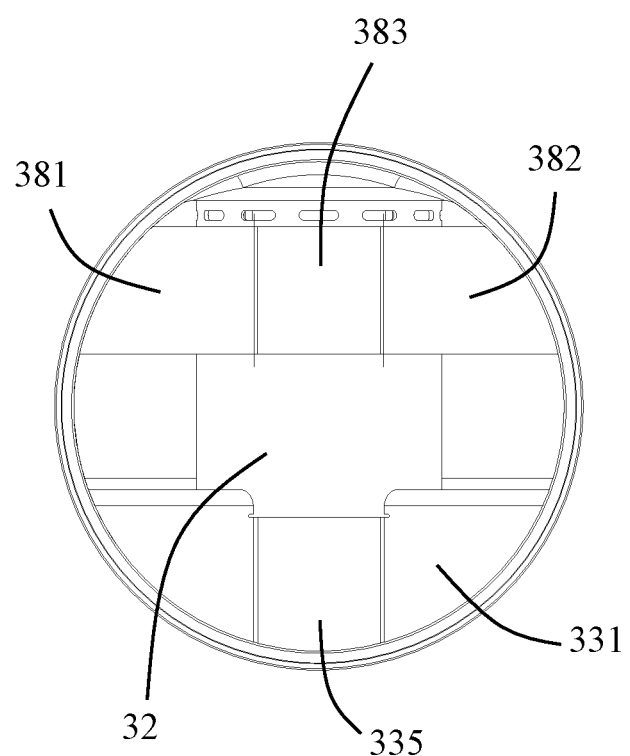
FIG. 3 is a left side view of FIG. 1.
Figure 4:
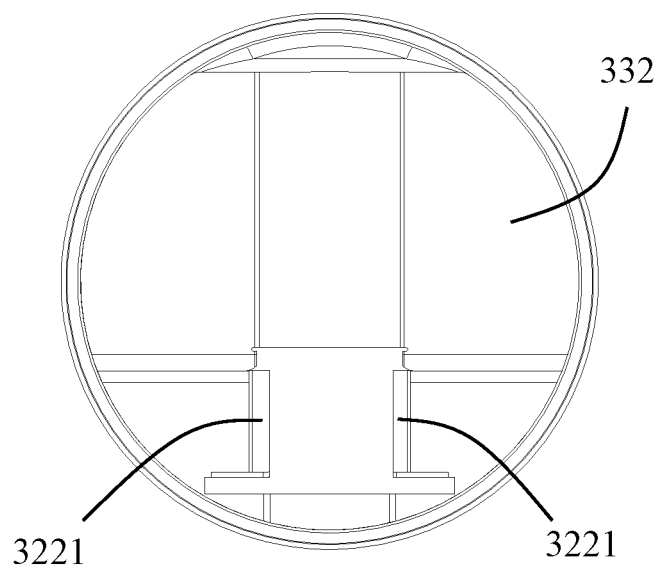
FIG. 4 is a right side view of FIG. 1.
Figure 5:
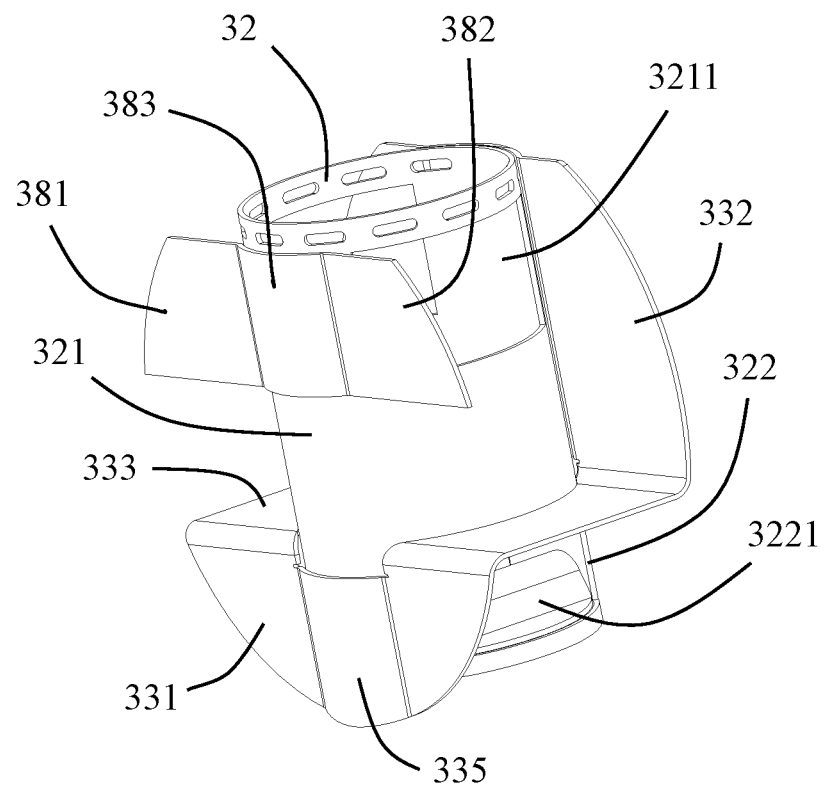
FIG. 5 is a perspective view with the casing in FIG. 1 removed.
Figure 6:
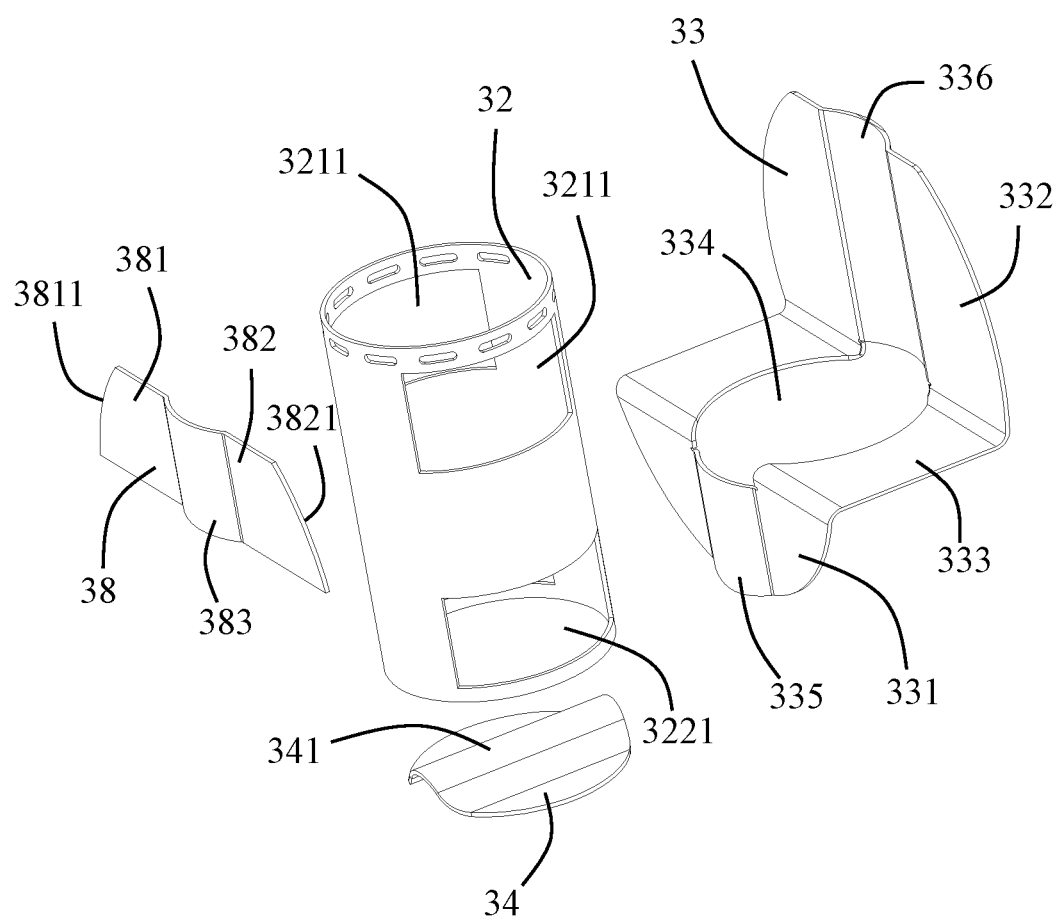
FIG. 6 is an exploded perspective view of FIG. 5.
Figure 7:
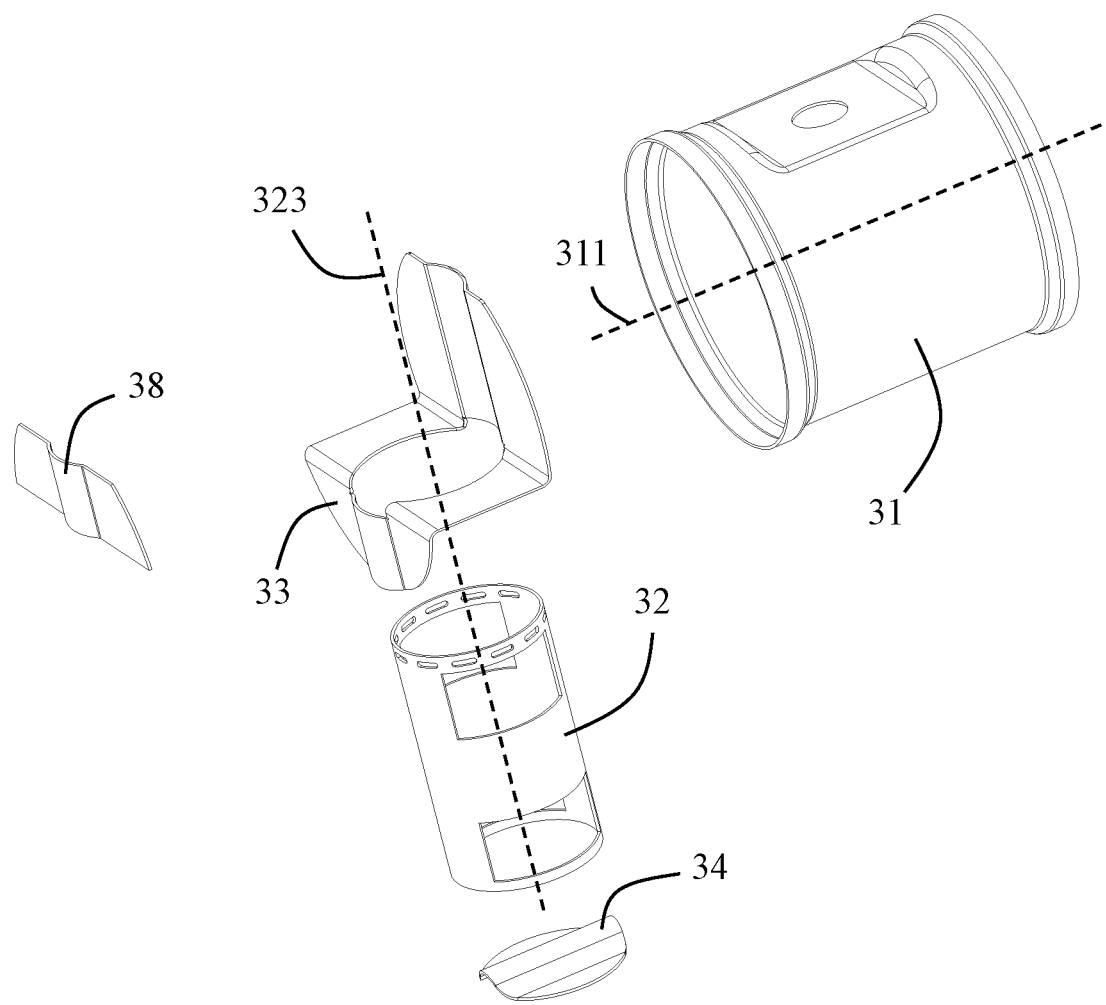
FIG. 7 is an exploded perspective view of FIG. 6.
Figure 8:
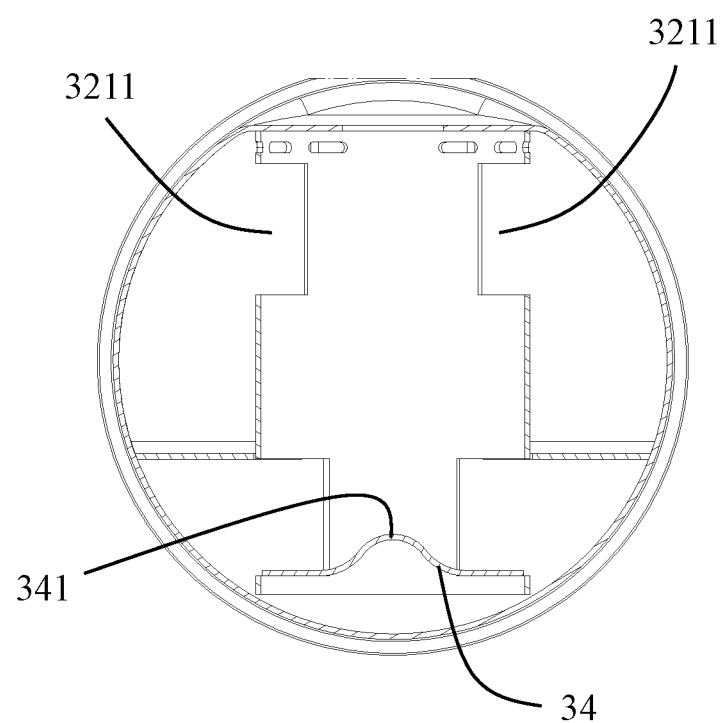
FIG. 8 is a schematic cross-sectional view taken along a line A-A in FIG. 1.
Figure 9:
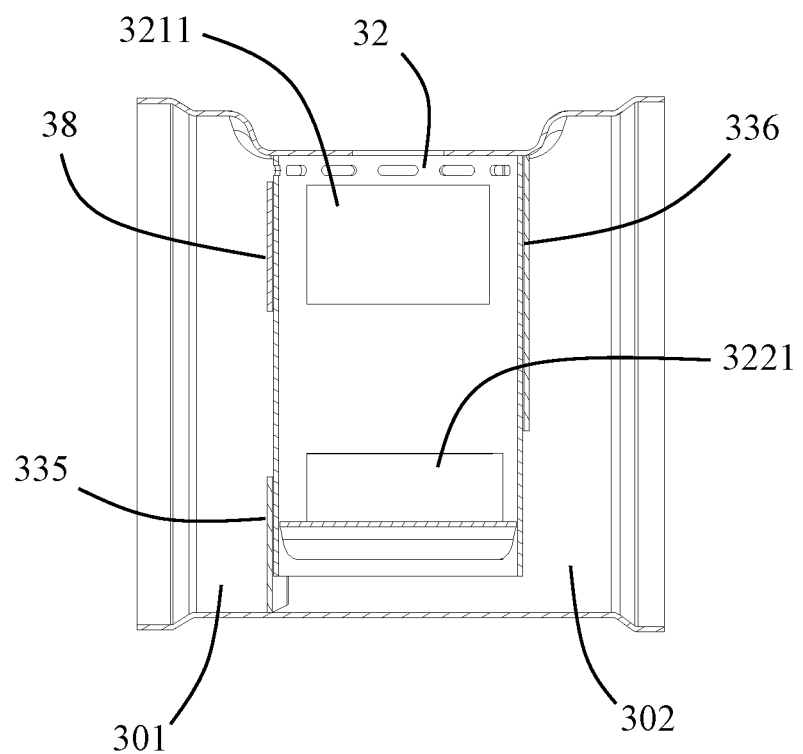
FIG. 9 is a schematic cross-sectional view taken along a line B-B in FIG. 1.

Please refer to FIG. 1 to FIG. 9, the present application discloses an exhaust gas after-treatment mixing device 3 for purifying exhaust gas of an engine. The exhaust gas after-treatment mixing device 3 includes a casing 31, a mixing pipe 32 located in the casing 31, a partition plate 33 fixed on a periphery of the mixing pipe 32, a plate 34 located at a bottom of the mixing pipe 32, and a rectifying plate 38 for partially shielding the mixing pipe 32.

The casing 31 is separated by the partition plate 33 to form a first space 301 for communicating with a first after-treatment carrier assembly and a second space 302 for communicating with a second after-treatment carrier assembly. In one embodiment of the present application, the first after-treatment carrier assembly may include a Diesel Oxidation Catalyst (DOC) and a Diesel Particulate Filter (DPF) located downstream of the DOC. The second after-treatment carrier assembly includes a Selective Catalytic Reduction (SCR).

The mixing pipe 32 includes a first pipe portion 321 located in the first space 301 and a second pipe portion 322 located in the second space 302. The first pipe portion 321 is provided with at least two first openings 3211 on two sides of the first pipe portion 321, respectively. The second pipe portion 322 is provided with at least two second openings 3221 on two sides of the second pipe portion 322, respectively. The second openings 3221 communicate with the second space 302. The first openings 3211 are used for airflow to flow in, and the second openings 3221 are used for airflow to flow out, so that a double swirl mixing effect is formed.

The rectifying plate 38 includes a first shielding plate 381 and a second shielding plate 382 shielding front ends of the first openings 3211, respectively. As a result, most of the exhaust gas needs to flow bypass the first shielding plate 381 and the second shielding plate 382 before entering the first openings 3211. This arrangement prevents the exhaust gas from directly rushing into the mixing pipe 32 and reflecting on the pipe wall, which affects the uniformity and stability of the airflow mixing. In the illustrated embodiment of the present application, the rectifying plate 38 includes a third curved surface 383 abutting on the first pipe portion 321. The first shielding plate 381 and the second shielding plate 382 are respectively extended oppositely from two sides of the third curved surface 383. Preferably, the third curved surface 383 is welded to the first pipe portion 321. The first shielding plate 381 is provided with a first arc edge 3811 abutting on an inside of the casing 31, and the second shielding plate 382 is provided with a second arc edge 3821 abutting on an inside of the casing 31, thereby forming an obstruction to the airflow in order to achieve the rectification effect.

In the illustrated embodiment of the present application, the casing 31 is of a cylindrical shape and is provided with a first axis 311. The mixing pipe 32 is of a cylindrical shape and is provided with a second axis 323. The first axis 311 intersects the second axis 323. Preferably, the first axis 311 is perpendicular to the second axis 323. Of course, in other embodiments, the casing 31 and the mixing pipe 32 may have other shapes, such as an oval shape.

The partition plate 33 includes a first plate 331 on one side of the mixing pipe 32, a second plate 332 on the other side of the mixing pipe 32, and a third plate 333 connecting the first plate 331 and the second plate 332. The third plate 333 is provided with a through hole 334 through which the mixing pipe 32 extends. In the illustrated embodiment of the present application, the mixing pipe 32 is arranged vertically. The first plate 331 and the second plate 332 both extend vertically but along opposite directions. The third plate 333 extends horizontally. Please refer to FIG. 5 to FIG. 7, the partition plate 33 is substantially Z-shaped. The first plate 331 is located at a lower left of the mixing pipe 32, and the second plate 332 is located at an upper right of the mixing pipe 32. The first plate 331 is provided with a first curved surface 335 abutting on the second pipe portion 322, and the second plate 332 is provided with a second curved surface 336 abutting on the first pipe portion 321.

The plate 34 is located at the bottom of the second pipe portion 322. The plate 34 is provided with an arc-shaped protrusion 341 protruding toward the second pipe portion 322 in order to guide the airflow to flow backwardly. The plate 34 can prevent the urea solution from being sprayed directly onto the exhaust pipe, thereby reducing the risk of urea deposit.

The exhaust gas after-treatment mixing device 3 is provided with an injector mounting seat (not shown) located on the casing 31 and used to install a urea injector for spraying atomized urea solution into the mixing pipe 32.

In the illustrated embodiment of the present application, when the exhaust gas of the engine passes through the first after-treatment carrier assembly into the first space 301, the exhaust gas bypasses the first shielding plate 381 and the second shielding plate 382 and then enters the mixing pipe 32 through the first openings 3211. When the injection conditions are satisfied, the urea injector sprays urea droplets into the mixing pipe 32, and the atomized urea droplets is mixed with the exhaust gas of the engine and move downstream, and then enter the second space 302 through the second openings 3221 to reach the second after-treatment carrier assembly. Under the action of the plate 34, the airflow is better reversed (for example, flow upstream) to form a double swirl flow. In this way, the distance and time of urea evaporation are increased by the swirl flow, the uniformity of airflow mixing is improved and the risk of urea deposit is reduced.

The above embodiments are only used to illustrate the present application and not to limit the technical solutions described in the present application. The understanding of this specification should be based on those skilled in the art, although the present application has been carried out with reference to the above-mentioned embodiments in the detailed description, however, those of ordinary skill in the art should understand that those skilled in the art can still modify or equivalently replace the present application, and all technical solutions and improvements without departing from the spirit and scope of the present application should be within the scope of the claims of the present application.

What is claimed is:

1. An exhaust gas after-treatment mixing device comprising:
   a casing;
   a mixing pipe located in the casing; and
   a partition plate fixed on a periphery of the mixing pipe, the casing being separated by the partition plate to form a first space communicating with a first after-treatment carrier assembly and a second space communicating with a second after-treatment carrier assembly, the partition plate comprising a first plate on one side of the mixing pipe, a second plate on the other side of the mixing pipe and a third plate connecting the first plate and the second plate, the third plate being provided with a through hole through which the mixing pipe extends; wherein the mixing pipe comprises a first pipe portion located in the first space and a second pipe portion located in the second space, wherein the first pipe portion is provided with at least two first openings located on two sides of the first pipe portion, respectively; wherein the exhaust gas after-treatment mixing device further comprises a first shielding plate and a second shielding plate shielding front ends of the first openings, respectively, so that most exhaust gas needs to bypass the first shielding plate and the second shielding plate before entering the first openings; and wherein the first shielding plate is provided with a first arc edge abutting on an inside of the casing, and the second shielding plate is provided with a second arc edge abutting on the inside of the casing.

2. The exhaust gas after-treatment mixing device according to claim 1, wherein the second pipe portion is provided with at least two second openings located on two sides of the second pipe portion, respectively, and the second openings communicate with the second space.

3. The exhaust gas after-treatment mixing device according to claim 1, wherein the casing is provided with a first axis, the mixing pipe is provided with a second axis, and the first axis is perpendicular to the second axis.

4. The exhaust gas after-treatment mixing device according to claim 3, wherein the mixing pipe is arranged vertically, the first plate and the second plate both extend vertically but along opposite directions, and the third plate extends horizontally.

5. The exhaust gas after-treatment mixing device according to claim 4, wherein the partition plate is substantially Z-shaped, the first plate is located at a lower left of the mixing pipe, and the second plate is located at an upper right of the mixing pipe.

6. The exhaust gas after-treatment mixing device according to claim 5, wherein the first plate is provided with a first arc-shaped surface abutting on the second pipe portion, and the second plate is provided with a second arc-shaped surface abutting on the first pipe portion.

7. The exhaust gas after-treatment mixing device according to claim 1, further comprising a rectifying plate fixed to the mixing pipe, and the first shielding plate and the second shielding plate are located on two sides of the rectifying plate, respectively.

8. The exhaust gas after-treatment mixing device according to claim 7, wherein the rectifying plate comprises a third curved surface abutting on the first pipe portion, and the first shielding plate and the second shielding plate extend sidewardly from the third curved surface along opposite directions.

9. The exhaust gas after-treatment mixing device according to claim 1, further comprising a plate located at a bottom of the mixing pipe, and the plate is provided with an arc-shaped protrusion protruding into the second pipe portion.

10. An exhaust gas after-treatment mixing device comprising:
a casing;
a tubular mixing pipe mounted in the casing; and
a partition plate fixed on a periphery of the mixing pipe and comprising a first plate on one side of the mixing pipe, a second plate on the other side of the mixing pipe and a third plate connecting the first plate and the second plate, the third plate being provided with a through hole through which the mixing pipe extends; wherein the mixing pipe comprises a first pipe portion and a second pipe portion located at top and bottom sides of the through hole, respectively; wherein the first pipe portion is provided with at least two first openings; wherein the exhaust gas after-treatment mixing device further comprises a rectifying plate located upstream of the mixing pipe, the rectifying plate comprising a curved portion fixed to the mixing pipe, a first shielding plate extending from one edge of the curved portion and a second shielding plate extending from the other edge of the curved portion, the first shielding plate and the second shielding plate shielding front ends of the at least two first openings, respectively, so that most exhaust gas needs to bypass the first shielding plate and the second shielding plate before entering the first openings.

11. The exhaust gas after-treatment mixing device according to claim 10, wherein the casing is provided with a first axis, the mixing pipe is provided with a second axis, and the first axis is perpendicular to the second axis.

12. The exhaust gas after-treatment mixing device according to claim 11, wherein the mixing pipe is arranged vertically, the first plate and the second plate both extend vertically but along opposite directions, and the third plate extends horizontally.

13. The exhaust gas after-treatment mixing device according to claim 12, wherein the partition plate is substantially Z-shaped, the first plate is located at a lower left of the mixing pipe, and the second plate is located at an upper right of the mixing pipe.

14. The exhaust gas after-treatment mixing device according to claim 13, wherein the first plate is provided with a first arc-shaped surface abutting on the second pipe portion, and the second plate is provided with a second arc-shaped surface abutting on the first pipe portion.

15. The exhaust gas after-treatment mixing device according to claim 10, wherein the first shielding plate is provided with a first arc edge abutting on an inside of the casing, and the second shielding plate is provided with a second arc edge abutting on the inside of the casing.

16. The exhaust gas after-treatment mixing device according to claim 10, further comprising a plate located at a bottom of the mixing pipe, and the plate is provided with an arc-shaped protrusion protruding into the second pipe portion.

* * * * *